US008448991B2

(12) United States Patent
Baxter et al.

(10) Patent No.: US 8,448,991 B2
(45) Date of Patent: May 28, 2013

(54) SECURE IDENTIFICATION DOCUMENTS

(75) Inventors: Paul Baxter, Horndean (GB); Wim Tappij Gielen, Strijen (NL)

(73) Assignee: DataCard Corporation, Minnetonka, MN (US)

( * ) Notice: Subject to any disclaimer, the term of this patent is extended or adjusted under 35 U.S.C. 154(b) by 698 days.

(21) Appl. No.: 12/281,486

(22) PCT Filed: Mar. 17, 2006

(86) PCT No.: PCT/US2006/009844
§ 371 (c)(1),
(2), (4) Date: Sep. 3, 2008

(87) PCT Pub. No.: WO2007/108791
PCT Pub. Date: Sep. 27, 2007

(65) Prior Publication Data

US 2009/0039643 A1 Feb. 12, 2009

(51) Int. Cl.
*B42D 15/00* (2006.01)
*G09C 3/00* (2006.01)

(52) U.S. Cl.
USPC .................. 283/98; 283/67; 283/70; 283/72; 283/74; 283/75; 283/77; 283/86; 283/108; 283/109; 283/110; 283/112; 283/901

(58) Field of Classification Search
USPC ................ 281/51; 283/57, 67, 68, 69, 70, 72, 283/74, 75, 77, 86, 98, 100, 108, 109, 110, 283/112, 117, 901, 904
See application file for complete search history.

(56) References Cited

U.S. PATENT DOCUMENTS 4,596,409 A 6/1986 Holbein et al.
4,732,410 A 3/1988 Holbein et al.
4,735,670 A 4/1988 Maurer et al.
5,350,198 A 9/1994 Bernecker
(Continued)

FOREIGN PATENT DOCUMENTS

DE 101 15 949 A1 10/2002
EP 0 372 837 A2 6/1990
EP 1 187 727 B1 6/2003
FR 2 711 438 A1 4/1994

OTHER PUBLICATIONS

International Search Report of PCT/US2006/009844.
(Continued)

*Primary Examiner* — Dana Ross
*Assistant Examiner* — Justin V Lewis
(74) *Attorney, Agent, or Firm* — Hamre, Schumann, Mueller & Larson, P.C.

(57) ABSTRACT

Improvements that prevent tampering of images on identification documents for example identity cards, credit cards and the like, and passports. The document includes a full color image of a person, and a second, full, achromatic image of the person formed underneath and spaced from the color image and in congruence therewith using a laser. The second full image is not visible underneath the first full image during normal viewing of the document, and is only visible upon removal of all or a portion of the first full image. As a result, the document and the image have no outwardly apparent visual difference to the document holder or to a would-be counterfeiter. This provides a covert security feature that is not known or seen until the document is attacked by removing the first full image.

13 Claims, 2 Drawing Sheets

U.S. PATENT DOCUMENTS

| | | | |
|---|---|---|---|
| 5,421,619 A | 6/1995 | Dyball | |
| 5,435,599 A * | 7/1995 | Bernecker | 283/70 |
| 5,774,168 A | 6/1998 | Blome | |
| 6,867,167 B1 | 3/2005 | Christen et al. | |
| 2004/0011874 A1 | 1/2004 | Theodossiou et al. | |

OTHER PUBLICATIONS

Supplementary European Search Report issued by the European Patent Office in related Application No. EP 06 73 8848.8 on Oct. 1, 2009.

* cited by examiner

20

22

24

SECURE IDENTIFICATION DOCUMENTS

This application is being filed as a PCT International Patent application in the name of DataCard Corporation, a U.S. national corporation.

FIELD

The invention relates to identification documents, for example identity cards, credit cards and the like, and passports, that contain an image of the intended document holder.

BACKGROUND

It is known to produce identity cards with an image of the intended card holder. The image allows visual identification of the card holder. Even with a protective overcoat over the image, it is possible to remove the photo pigments that form the image using a combination of chemicals and acute abrasives. The removed image can then be substituted with a new image and the card used fraudulently. Efforts have been devised to prevent tampering of the image on an identity card. For example, see U.S. Pat. Nos. 5,350,198; 5,435,599; 5,774,168; 6,633,321; and 6,867,167 (EP 1 187 727).

However, continued improvements are necessary to prevent tampering of images on identification documents.

SUMMARY

This disclosure relates to improvements that prevent tampering of images on identification documents for example identity cards, credit cards and the like, and passports.

In one embodiment, an identification document includes a full color image of a person. A second, full, achromatic image of the person is formed underneath and spaced from the color image and in congruence therewith using a laser.

The second full image is not visible underneath the first full image during normal viewing of the document, and is only visible upon removal of all or a portion of the first full image. As a result, the document and the image have no outwardly apparent visual difference to the document holder or to a would-be counterfeiter. This provides a covert security feature that is not known or seen until the document is attacked by removing the first full image. Once attacked, and the second full image discovered to be non-removable, the document is then already damaged to such a point to be unusable (either validly or fraudulently).

In a method of forming an identification document containing a first, full, color printed image of a person, the method is characterized by forming a second, full, achromatic image of the person underneath and spaced from the first full image and in congruence therewith using a laser. In a preferred embodiment, the second, full image is formed after the first, full image is formed.

The first and second images can be applied in a single personalization system that includes both color printing capability and laser engraving capability in an inline process. The system can be either single pass or multipass. The same image file can be used for forming the first full image and the second full image. As a result, no software adjustments need to be made, and the data processing and handling is simplified.

DRAWINGS

DETAILED DESCRIPTION

The description describes improvements to identification documents having images of the intended holders of the identification documents. The improvements help prevent tampering of the images, thereby deterring fraudulent use of the identification documents. The identification documents to which the improvements apply include, for example, identity cards, financial (e.g. credit and debit) cards, driver's licenses, passports, and other identification documents that bear images of the intended document holders. For sake of convenience, the invention will be described in detail below with respect to an identity card.

Figure 1:
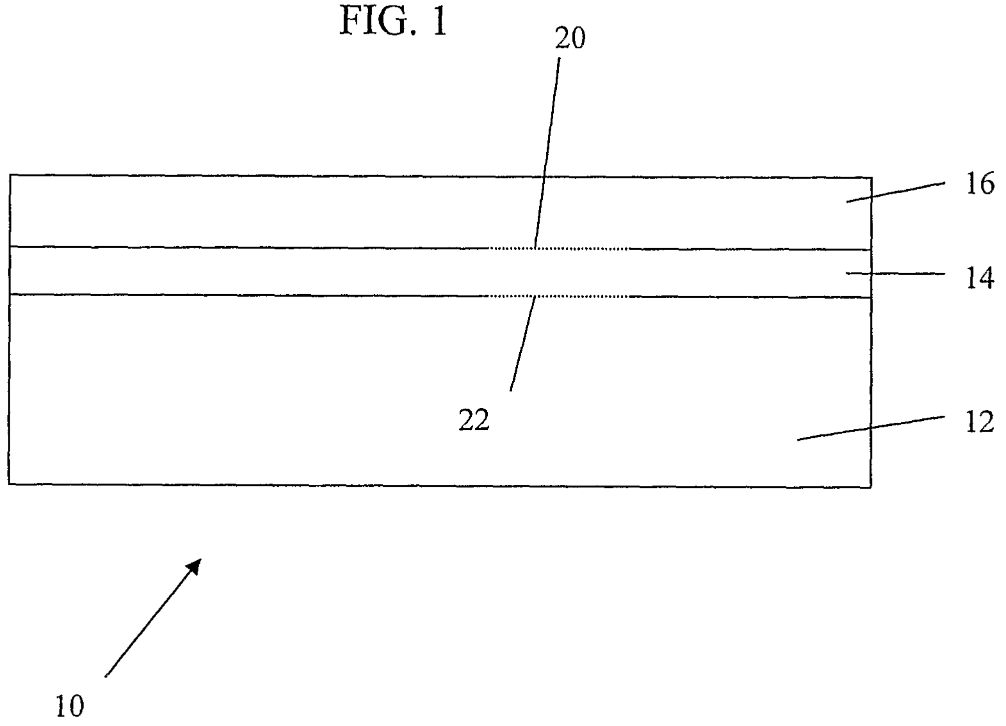
FIG. 1 is a diagrammatic sectional view of an identification document, in particular an identity card, according to the invention.

Referring to FIG. 1, an identity card 10 is shown as including a substrate 12, a printing layer 14 and a protective overlay 16. The substrate 12 can be made of a material commonly used to form identity cards, for example plastics such as polyvinyl chloride (PVC), polyester terephthalate modified with glycol (PETG), polycarbonate, or a composite material. The material of the substrate 12 must be receptive to laser engraving which is a known process that permanently alters the substrate 12 by projecting a laser beam onto the surface of the substrate 12. Laser engraving is disclosed in U.S. Pat. Nos. 5,350,198; 5,774,168; and 6,633,321.

The printing layer 14 is a layer that is receptive to the various color printing technologies used for identity cards. Suitable printing technologies include dye diffusion thermal transfer (D2T2), dye diffusion retransfer, pigment retransfer, and less commonly inkjet. The specific material of the printing layer 14 is known to persons having ordinary skill in the art.

The protective overlay 16 is a layer that protects the card against abrasion, chemicals and moisture. An example of a suitable overlay 16 is DURAGARD® clear laminate available from DataCard Group of Minnetonka, Minn., United States. The overlay 16 could also be a holographic or other security featured foil laminate known in the art.

With reference to FIGS. 1 and 2A-C, first and second full images 20 and 22, respectively, of the intended card holder are formed on the card 10. A full or complete image is one where the entire image of at least the face of the card holder is reproduced on the card, rather than select portions of the image, whereby the card holder can be visually identified by either image. If desired, the two images 20, 22 can each include a soft/faded/blurred border on the respective image to aid in disguising any small misalignment between the two images 20, 22.

Figure 2A:
FIG. 2A depicts a first, full, color printed image that can be formed on the card. Although the image is shown in black and white in the figure, it would be in color on an actual card.

The first full image 20 is a complete image that is color printed on the printing layer 14. Preferably, the image 20 is formed by dye diffusion or pigment based printing (either direct or retransfer technology), which are well known in the art. FIG. 2A illustrates the first full image (it being understood that the image 20 is shown in FIG. 2A as being achromatic but would be in color on an actual card 10). In the case of a passport, retransfer technology would preferably be used to apply the image 20 to a plastic data page within the passport.

Figure 2B:
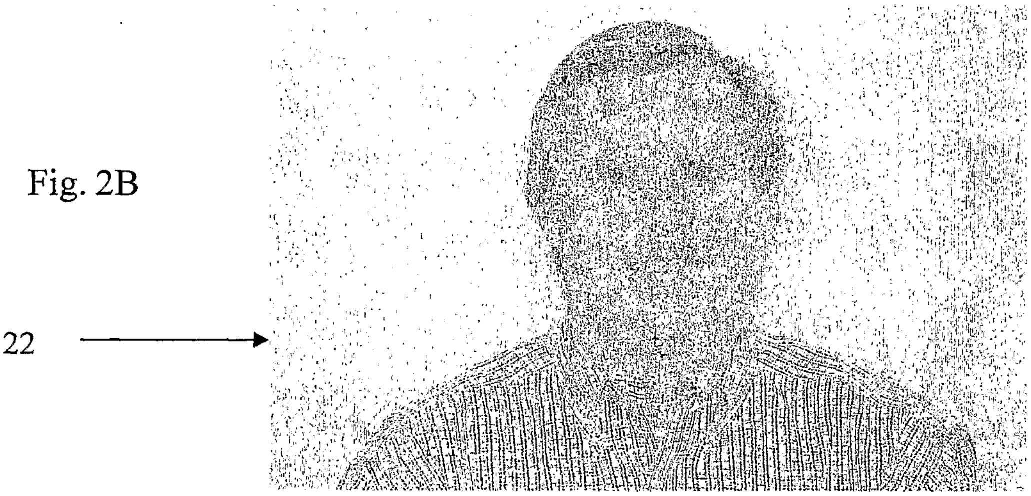
FIG. 2B depicts a second, full, achromatic image that can be formed on the card.

The second full image 22 is formed on the substrate 12 underneath the first full image 20 and in congruence therewith. The second full image 22 is formed by projecting a laser beam from a laser mechanism onto the surface of the substrate 12 which permanently alters the surface of the substrate 12 with an achromatic version of the image of the intended card holder, as shown in FIG. 2B. The image 22 is applied with the laser set at an opacity level (i.e. gamma/brightness/contrast) so that the image 22 does not significantly affect the resulting aesthetics of the first image 20 above it. For example, the image 22 can be lasered with 50% opacity settings. The resulting image 22 is a gray scale image.

Figure 2C:
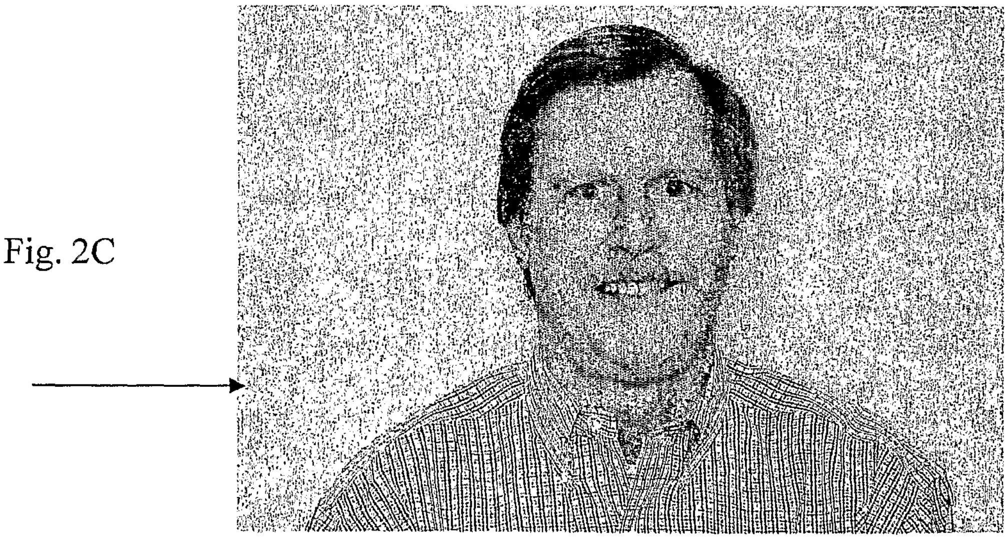
FIG. 2C is an approximation of a resulting image with the second, full image of FIG. 2B disposed underneath, spaced from, and congruent with the first, full image of FIG. 2A.

FIG. 2C illustrates the resulting image 24 with the second, full image of FIG. 2B disposed underneath, spaced from, and congruent with the first, full image of FIG. 2A. If desired, the soft/faded/blurred borders discussed above can be used. The second image 22 has minimal or no impact on the aesthetics of the first image 20, so that the resulting image 24 appears to be essentially the image 20. Further, the second image 22 is not visible underneath the first image 20 during normal viewing of the document, and is only visible upon removal of all or a portion of the first image 20. Thus, the second image 22 forms a covert security feature that is not known or seen until the document is attacked in an attempt to remove the first image 20. Once the first image 20 is attacked, and the second image 22 discovered to be non-removable, the card is then already damaged to such a point to be unusable (either validly or fraudulently).

Preferably, the image 22 is formed on the card 10 after the first image 20 is printed. The images 20, 22 can be applied in a single personalization system that includes both color printing technology and laser engraving technology in an inline (single pass or multipass) process. Preferably, the same image file is used for forming the first image 20 and the second image 22. As a result, no software adjustments need to be made, and the data processing and handling is simplified.

The concepts described herein could be used on other color information or data on identification documents, such as color logos. In addition, the concepts herein could be used on non-color information or data on identification documents, where lasered information is formed underneath and spaced from printed data and in congruence therewith.

The invention claimed is:

1. An identification document comprising a first, full, color printed image of a person, and a second, full image of the person is disposed underneath and spaced from the first, full image and in congruence therewith; the second, full image being an achromatic laser engraved image, wherein the second image is not visible underneath the first image during viewing of the document with an unaided eye, and the second image is only visible upon removal of all or a portion of the first image.

2. The identification document of claim 1, wherein the document is an identity card, financial card, a driver's license, or a passport.

3. The identification document of claim 1, wherein the second image is a gray scale image.

4. The identification document of claim 1, wherein the second image is applied with 50% opacity settings on the laser.

5. The identification document of claim 1, wherein the first, color printed image is a dye diffusion or pigment based printed image.

6. A method of forming an identification document containing a first, full, color printed image of a person, the method comprising:

forming a second, full, achromatic image of the person underneath and spaced from the first, full image and in congruence therewith using a laser so that the second image is not visible underneath the first image during viewing of the document with an unaided eye and the second image is only visible upon removal of all or a portion of the first image.

7. The method of claim 6, wherein the document is an identity card, a financial card, a driver's license, or a passport.

8. The method of claim 6, wherein the second image is a gray scale image.

9. The method of claim 6, wherein the second, achromatic image is applied with 50% opacity settings on the laser.

10. The method of claim 6, wherein the first image is applied by dye diffusion or pigment based printing, and the printing is direct printing or retransfer printing.

11. The method of claim 6, wherein the second, achromatic image is applied after the first image is applied.

12. The method of claim 6, further comprising using the same image file to form the first, color printed image and the second, achromatic image.

13. The method of claim 6, further comprising blurring the border of the first image and the second image.

* * * * *